Figure 1:
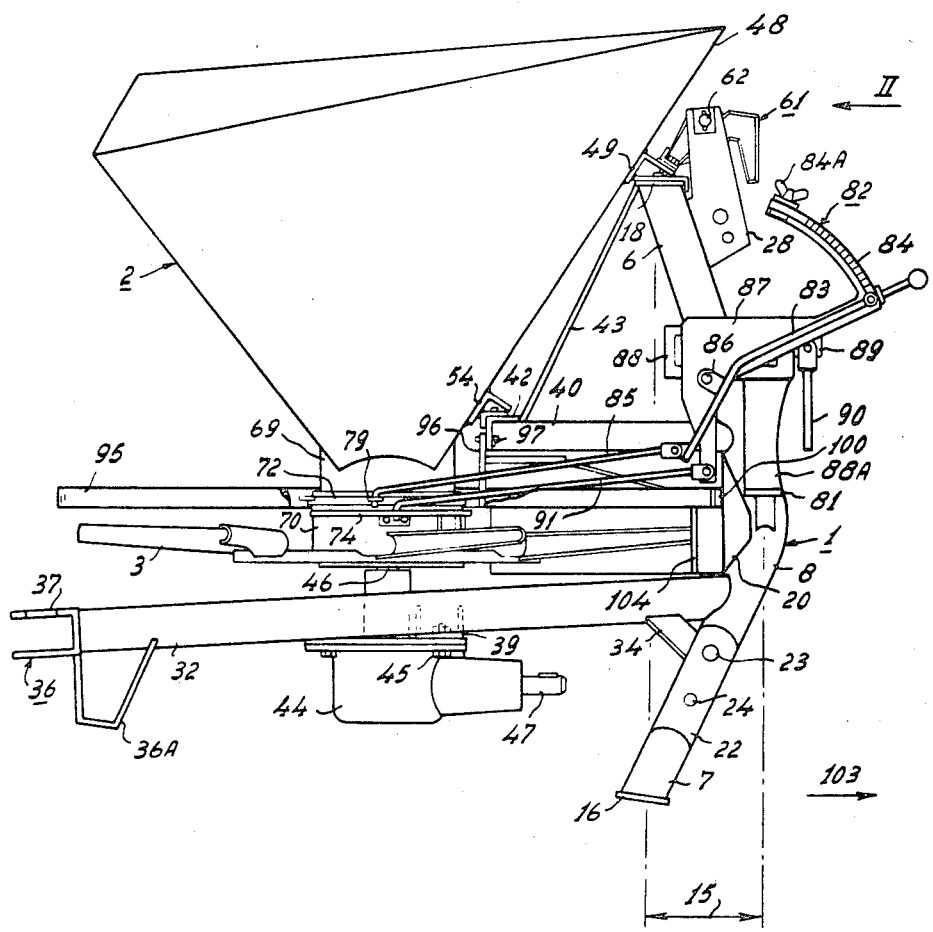

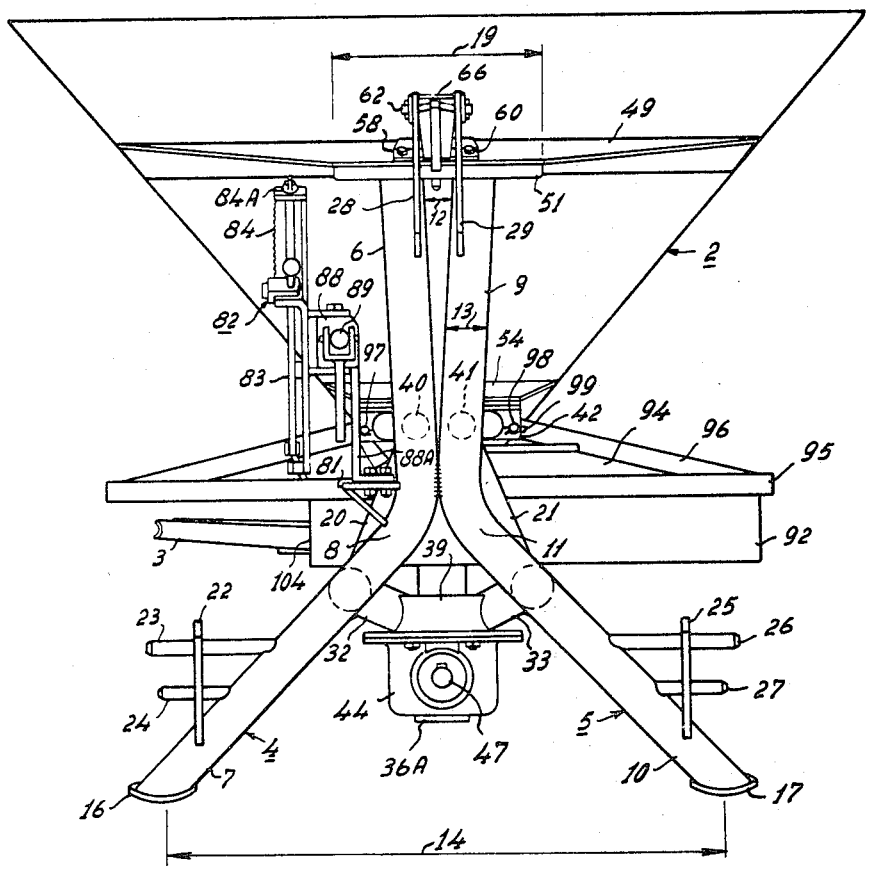

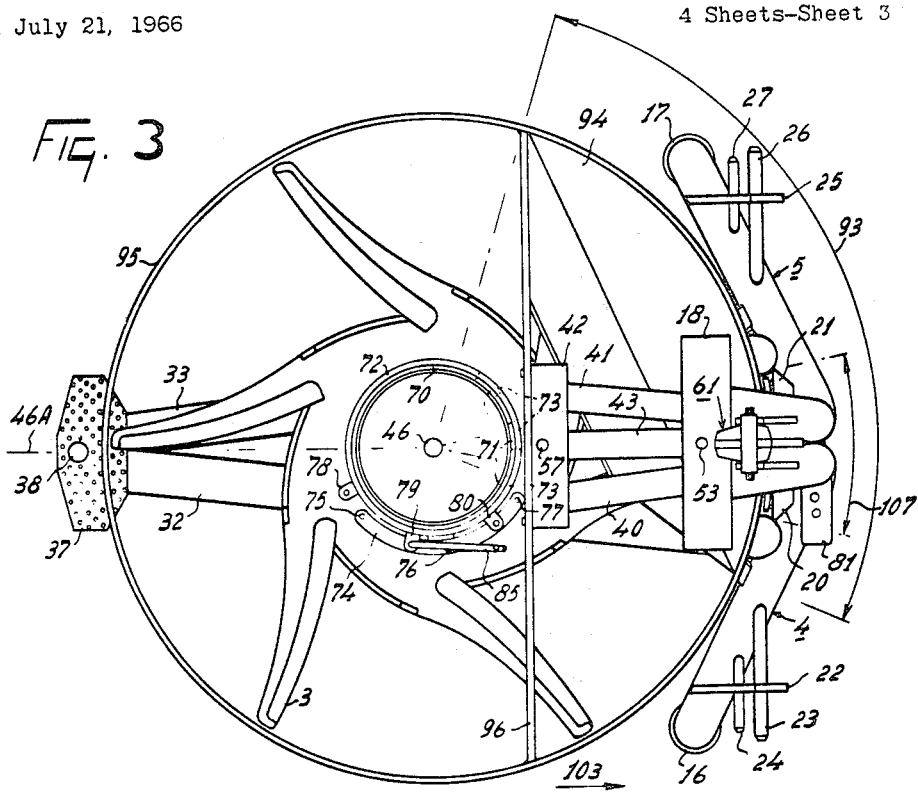
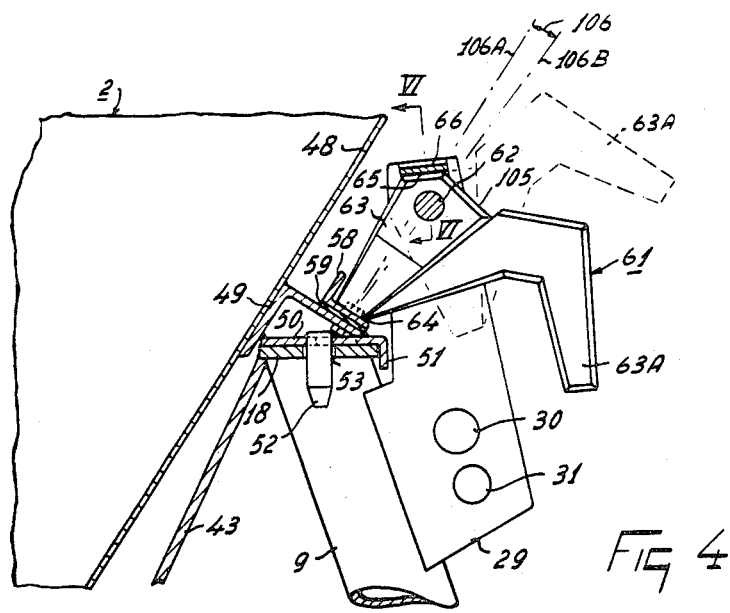
INVENTORS
CORNELIS VAN DER LELY
ARY VAN DER LELY
BY
Mason, Mason & Albright
Attorneys June 11, 1968   C. VAN DER LELY ET AL   3,387,792
IMPLEMENT FOR SPREADING POWDERY OR GRANULAR MATERIAL
Filed July 21, 1966   4 Sheets-Sheet 4
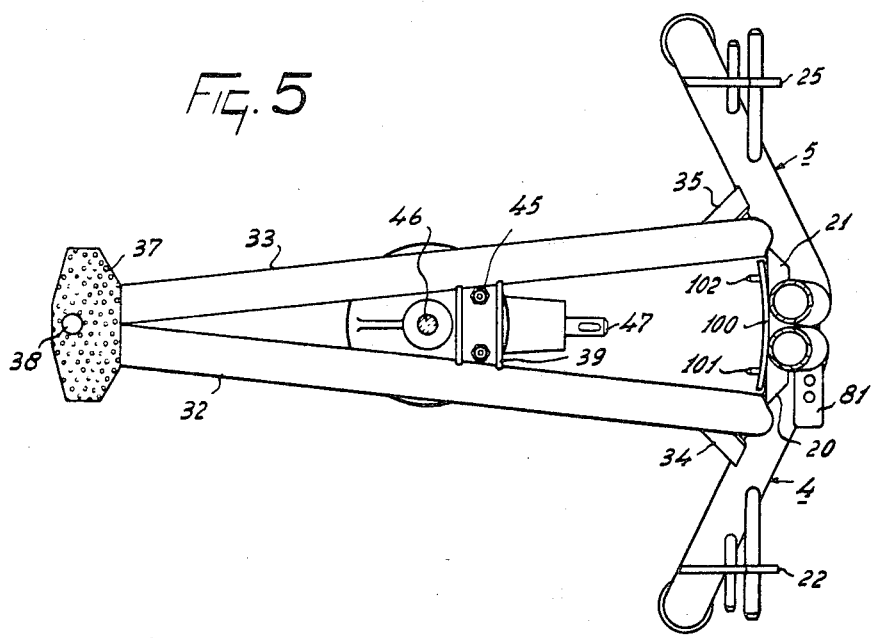
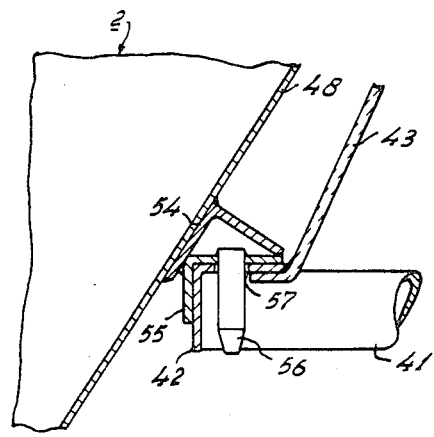
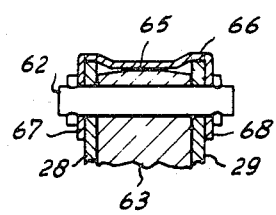
INVENTORS
CORNELIS VAN DER LELY
ARY VAN DER LELY
BY
Mason, Mason & Albright
Attorneys

United States Patent Office 3,387,792
Patented June 11, 1968

3,387,792
IMPLEMENT FOR SPREADING POWDERY OR GRANULAR MATERIAL
Cornelis van der Lely, 7 Bruschenrain, Zug, Switzerland, and Ary van der Lely, 10 Weverskade, Maasland, Netherlands
Continuation-in-part of application Ser. No. 318,968, Oct. 25, 1963. This application July 21, 1966, Ser. No. 566,933
5 Claims. (Cl. 239—688)

This application is a continuation-in-part of Ser. No. 318,968 filed Oct. 26, 1963.

The invention relates to an implement for spreading powdery or granular material of the kind which can be connected to the hydraulic lifting device of a tractor.

An object of the invention is to provide a stable support for the implement if it is disconnected from the lifting device of the tractor.

According to the invention the implement comprises a frame, a hopper for said material mounted on the frame, a rotary spreading member on the frame below said hopper, said hopper having a discharge opening communicating with said spreading member, said frame comprising a substantially V-shaped frame portion arranged underneath said spreading member, linkage means on said frame for coupling the implement to the hydraulic lifting device of a tractor, said V-shaped frame portions having frame beams diverging into the intended direction of travel of the implement, the frame being supported when not coupled to the lifting device of the tractor, on three supports arranged below said frame, two foremost supports being arranged at or near the foremost end of said V-shaped frame portion each of said foremost supports having a foot which is in top view at least partly outside of said V-shaped frame portion, so as to obtain a stable support for said implement.

Another object of the invention is to provide an easy connection of the implement to the hydraulic lifting device of the tractor.

According to the invention the feet of said three supports are situated in a plane, or nearly to, which is inclined to the plane of the V-shaped frame portion.

For a better understanding of the invention, and to show how the same may be carried into effect, reference will now be made, by way of example, to the accompanying drawings, in which:

FIGURE 1 is a side elevation of a spreading implement in accordance with the invention, FIGURE 2 is a view as seen in the direction indicated by the arrow II of FIGURE 1, FIGURE 3 is a plan view corresponding to FIGURES 1 and 2 but with an upper part of the implement removed, FIGURE 4 is a sectional side elevation showing certain parts of the implement to an enlarged scale and in greater detail, FIGURE 5 is a part-sectional plan view of the implement of FIGURES 1 to 4 with a number of the upper parts thereof removed, FIGURE 6 is a section taken on the line VI—VI of FIGURE 4, FIGURE 7 is a sectional side elevation taken in the same direction and to the same scale as FIGURE 4 and shows further details of the fastening of certain parts of the implement to one another.

Referring to the figures of the drawings, the implement which is illustrated has a frame generally indicated by the reference numeral 1 arranged to support a container in the form of a hopper generally indicated by the reference numeral 2. The frame 1 also supports a spreading member or ejector 3 at a level below that of the hopper 2. The frame 1 has two upwardly extending tubular beams 4 and 5 that are arranged symmetrically on opposite sides of a vertical plane 46A (FIGURE 3) of approximate symmetry of the implement extending in the intended direction of travel thereof which is indicated by the arrow 103 in FIGURES 1 and 3. The frame beams 4 and 5 form an upstanding frame portion. The beam 4 has two straight portions 6 and 7 that are integrally interconnected by a bend 8 in such a way that an angle having a magnitude in excess of 90° is enclosed between the portions 6 and 7. The beam 5 has straight portions 9 and 10 similarly interconnected by a bend 11. As can be seen in FIGURE 2, the bends 8 and 11 are in contact with one another and are welded together at this point. The upper straight portions 6 and 9 diverge upwardly away from the bends 8 and 11 so that their uppermost ends are spaced apart by a distance 12, this distance being approximately equal to the diameter 13 of one of the tubular beams 4 or 5.

The lower straight portions 7 and 10 of the beams 4 and 5 diverge downwardly away from the bends 8 and 11 in such a way that, when seen in front elevation (FIGURE 2), they are inclined to one another at an angle of about 90°. The lowermost ends of the two portions just mentioned are spaced apart by a distance 14 that is approximately equal to the diameter of the spreading member or ejector 3. As can be seen in FIGURE 1, all of the four portions 6, 7, 9 and 10 are rearwardly inclined from the bends 8 and 11 relative to the intended direction of travel 103. The longitudinal axes of the portions 6 and 7 at the free ends thereof and also those of the portions 9 and 10 at similar points are spaced rearwardly from the mid-points of the bends 8 and 11 by a distance 15 (FIGURE 1). The lowermost ends of the supports or portions 7 and 10 carry foot plates 16 and 17 respectively. The uppermost ends of the portions 6 and 9 are interconnected by an approximately horizontal plate 18 (FIGURE 1), this plate having a width 19 (FIGURE 2) which is approximately equal to twice the distance between the relatively remote sides of the uppermost ends of the portions 6 and 9. The rigidity of the bends 8 and 11 is increased by the provision of strengthening plates 20 and 21 respectively.

Towards its lowermost end of the straight portion 7 of the beam 4 is provided with an upwardly projecting strip 22 that is also fastened to the said portion by two horizontally projecting pins 23 and 24. The pin 23 is of greater diameter and greater length than the pin 24 and is located a short distance above the latter. As can be seen in FIGURE 2 of the drawings, both the pins 23 and 24 extend through the strip 22 and have free ends projecting beyond the said strip. The portion 10 of the beam 5 is provided with a strip 25 and with pins 26 and 27 that are symmetrically identical with the strip 22 and pins 23 and 24 respectively.

The portions 6 and 9 of the beams 4 and 5 carry cheek plates 28 and 29 respectively, these plates projecting forwardly of the beams relative to the intended direction of travel 103 and being formed with two pairs of horizontally aligned holes 30 and 31 (FIGURE 4). The holes 30 are a little larger than the holes 31 and are located at a level above that of the latter.

Two approximately horizontal straight beams 32 and 33 are fastened to the beams 4 and 5 immediately below the respective bends 8 and 11, the beams 32 and 33 projecting rearwardly from the beams 4 and 5 relative to the direction 103. The connections between the beams 32 and 33 and the beams 4 and 5 respectively are strengthened by the provision of inclined struts 34 and 35 (FIGURES 1 and 5). The beams 32 and 33 form a substantially V-shaped frame portion and are spaced apart at their leading ends and converge rearwardly of the direction 103 to intersect at their rearmost ends. A forked bracket 36 is rigidly mounted at this point, the upper limb 37 of the bracket having a substantially greater width than that of the lower limb and being roughened on its upper surface (see FIGURES 3 and 5) so as to form a step. A bent strip 36A is fastened to the lowermost sides of the beams 32 and 33 adjacent their rearmost ends, and also to the forked bracket 36, and affords a third support adapted to be used in conjunction with the foot plates 16 and 17. An approximately vertically aligned pair of holes 38 is formed through the two limbs of the bracket 36. The two beams 32 and 33 are interconnected at very approximately their mid-points by a transverse channel-shaped beam 39 (FIGURES 1, 2 and 5). The foot plates 16 and 17 are, as is shown in FIGURE 5, in top view situated outside of the V-shaped frame portion formed by the frame beams 32, 33.

Two substantially horizontally disposed beams 40 and 41 diverge rearwardly, relative to the direction 103, from the beams 4 and 5 respectively at points immediately above the bends 8 and 11 (see FIGURES 2 and 3). The rearmost ends of the beams 40 and 41 are interconnected by a transverse beam 42 of inverted L-shaped cross-section whose opposite ends project a short distance beyond the relatively remote sides of the beams 40 and 41. An upwardly and rearwardly inclined strip 43 interconnects the centre of the rearmost edge of the horizontal limb of the beams 42 and the centre of the leading edge of the plate 18.

A gear casing 44 is fastened to the lower side of the beam 39 with the aid of bolts 45, the gear casing having an approximately vertically disposed output shaft 46 to the upper end of which the spreading member or ejector 3 is fastened and an approximately horizontally disposed input shaft 47 which projects forwardly from the casing 44 in the direction 103.

The hopper 2 has an upper portion 48 which is of approximately inverted pyramid shape, said portion being provided on its front side at a short distance below its uppermost edge with a horizontally extending bar 49 of L-shaped cross-section. As can be seen in the drawings, one limb of the bar 49 is welded or otherwise rigidly secured to the front side of the hopper portion 48. A horizontally disposed strip 50 (FIGURE 4) is rigidly secured to the limbs of the bar 49 and has its leading edge turned over downwardly so as to form a rim 51. As can be seen in FIGURE 4, the rearmost side of the rim 51 abuts against the leading edge of the plate 18. A downwardly projecting dowel 52 is rigidly mounted centrally of the strip 50 and is entered through a co-operating hole 53 formed in the plate 18.

Towards the lowermost end of the leading side of the hopper portion 48, a bar 54 of L-shaped cross-section is rigidly mounted in a similar manner to the previously described bar 49. A further bar 55 of L-shaped cross-section is rigidly secured to the limbs of the bar 54 in such a way that one of its own limbs is approximately horizontally disposed with the other limb projecting approximately vertically downwards from the rearmost edge thereof. As can be seen in FIGURE 7, the limbs of the bar 55 make abutting engagement above and behind the corresponding limbs of the similarly shaped beam 42. A downwardly projecting dowel 56 is rigidly secured at the centre of the horizontal limb of the bar 55 and is entered through a co-operating hole 57 formed centrally of the horizontal limb of the beam 42.

The uppermost side of the forwardly and downwardly projecting limb of the bar 49 (FIGURE 4) has a relatively short bar 58 of L-shaped cross-section secured to it with the aid of bolts 60 (FIGURE 2), a spacing strip or plate 59 being sandwiched between the limbs of the two bars 49 and 58.

A retaining mechanism for the hopper 2 is generally indicated by the reference numeral 61 and is located between the two cheek plates 28 and 29. The retaining mechanism 61 includes a clamp 63 (FIGURE 4) arranged so as to be turnable about a horizontal pivot pin 62 extending between the cheek plates 28 and 29. The lowermost side 64 of the clamp 63 bears against the upper side of the forwardly and downwardly projecting limb of the short bar 58 whilst its uppermost side 65 cooperates with a leaf spring 66 to tend to prevent it from turning about the pivot pin 62. As can be seen in FIGURE 6 of the drawings, the leaf spring 66 is of approximately inverted channel-shaped cross-section having an approximately horizontally extending web flanked on opposite sides by vertically extending limbs 67 and 68. The uppermost side 65 of the clamp 63 bears against the web of the spring 66 whilst holes are formed in the limbs 67 and 68 to register with holes formed in the respectively abutting cheek plates 28 and 29, the pivot pin 62 being entered through all the said holes and through a hole in the clamp 63 whereby the leaf spring 66 is retained in its appointed position. The clamp 63 has a further flat side 105 whose purpose will hereinafter be described and includes a handle 63A by which the whole clamp can be turned manually about the pivot pin 62.

The lowermost end of the portion 48 of the hopper 2 is connected to an outlet portion in the form of a cylindrical nozzle 69. The lowermost end of the nozzle 69 is, in turn, surrounded by an annulus 70 whose lowermost edge bears against the upper side of a central region of the spreading member or ejector 3. The annulus is formed with three relatively spaced outlet ports 71 (FIGURE 3) and is surrounded towards its upper end by a ring 72 carrying three downwardly projecting masking plates or shutters 73 each of which is adapted to co-operate with a corresponding one of the outlet ports 71 to close the latter to a chosen extent. A sector plate 74 (FIGURES 1 and 3) projects horizontally from the side of the annulus 70 and is formed with three angularly spaced holes 75, 76 and 77. The ring 72, on the other hand, is provided with three separate horizontally projecting and angularly spaced apertured lugs 78, 79 and 80.

The beam 4 carries a support 81 at the level of the bend 8, the said support having an adjusting mechanism, generally indicated by the reference numeral 82, mounted thereon. The adjusting mechanism 82 includes a control lever 83 arranged to be turnable about a horizontal pivot pin 86 along a curved member 84 provided with a scale. A clamp 84A can be moved to any chosen position along the scale and retained in that position to prevent the control lever 83 from moving beyond it. The lowermost end of the control lever 83 is pivotally connected to one end of a coupling rod 85 whose opposite end is entered through the hole formed in one of the three lugs 78 to 80. In the setting of the implement which is shown in the drawings, the end of the coupling rod 85 remote from the control lever 83 is entered through the hole formed in the lug 79.

The pivot pin 86 is rigidly secured to a slide 87 which also carries the curved member 84. The slide 87 can be moved relative to a slotted housing 88 in a direction parallel to the direction 103 with the aid of a screw-threaded spindle 89 only the leading end of which can be seen in FIGURES 1 and 2 of the drawings. The spindle 89 is arranged to be turned by a pivotally mounted handle 90 that normally occupies the position shown in the drawings so as to prevent rotation of the spindle 89 under the action of gravity. It will be evident that the spindle 89 is mounted in the housing 88 so as to be rotatable but substantially axially immovable whilst the slide 87 engages the spindle with the aid of a correspondingly screw-threaded block or the like (not visible) so that, upon rotation of the spindle, the block and slide 87 must move along the slotted housing 88 in an appropriate direction. The lowermost end of the slide 87 is pivotally connected to one end of a coupling rod 91, the opposite end of this coupling rod being bent over and entered in one of the holes 75 to 77 formed in the sector plate 74. In the setting of the implement which is shown in the drawing, the bent-over end of the coupling rod 91 is entered in the centre hole 76. A pillar 88A is employed to rigidly interconnect the housing 88 and the support 81.

An arcuately curved screening baffle 92 is arranged around a portion of the periphery of the spreading member or ejector 3, the said baffle subtending an angle 93 (FIGURE 3) having a magnitude of about 90° at the axis of the output shaft 46 of the gear casing 44. The screening baffle 92 is fastened to the curved edge of a screening plate 94 (FIGURE 3) that lies over and above a portion of the spreading member or ejector 3. Both the baffle 92 and the plate 94 are fastened to a circular guard 95 which has a slightly greater diameter than that of the ejector 3 and which is arranged immediately above the latter so as to be concentric therewith. An arched strip 96 (FIGURES 2 and 3) has its opposite ends connected to the concave side of the guard 95 and extends in chordwise relationship relative to the latter. The uppermost central region of the arched strip 96 carries two dowels 97 and 98 that are entered in matching holes formed in the substantially vertically disposed limb of the beam 42. As can be seen in FIGURES 1 and 2 of the drawings, small transverse bores are formed through the dowels 97 and 98 towards the tips thereof and resilient retaining clips 99 are entered through these bores to prevent the strip 96 from becoming detached from the beam 42. An arcuately curved strip 100 (FIGURES 1 and 5) is rigidly secured to the rearmost sides of the strengthening plates 20 and 21 and carries two rearwardly projecting dowels 101 and 102. The dowels are entered through matching holes formed in the circular guard 95.

In the use of the implement which has been described, it is coupled to the lifting links of the three-point lifting device of a tractor or other propelling vehicle. The free ends of the lower lifting links of the lifting device are engaged with the pins 23 and 26 whilst a horizontal pivot pin is employed to connect the free end of the adjustable upper lifting link to the cheek plates 28 and 29 by means of the aligned holes 30. If necessary, the slightly smaller diameter pins 24 and 27 and holes 31 may be employed to the same end. The input shaft 47 of the gear casing 44 is coupled to the power take-off shaft of the tractor or other propelling vehicle with the aid of a transmission shaft having universal joints at its opposite ends. When the implement is lifted clear of the ground by means of the lifting device and moved over the same in the direction 103 with the ejector 3 rotating about the axis of the shaft 46, material from the hopper 2 which reaches the ejector 3 will be spread radially outwardly from the latter due to the energy imparted to it as a result of the rotation of the ejector.

The material from the hopper 2, such as artificial fertiliser or seeds, reaches the ejector 3 through the outlet ports 71. These ports can be closed wholly, or to a desired extent, by the masking plates or shutters 73 so that the volume of material per unit time which is distributed by the implement can be controlled. It will be apparent that, assuming a constant speed of travel of the implement, the volume of material per unit area of ground will be similarly controlled.

In the setting of the annulus 70 which is illustrated in the drawings, the outlet ports 71 are disposed towards the front side of the implement relative to the direction 103, this arrangement being such that the major part of the material actually leaves the ejector 3 towards the rear side of the implement and is spread approximately equally on opposite sides of the aforementioned vertical plane 46A of approximate symmetry of the implement. The screening baffle 92 prevents any material from being thrown forwardly on to the tractor or other propelling vehicle. The guard 95 prevents the driver of the tractor or other vehicle from accidentally touching the rotating ejector 3 and also prevents the latter from fouling any objects which the implement may touch.

The position of the strip of ground upon which material falls relative to the plane 46A can be varied by turning the annulus 70 around the cylindrical outlet nozzle 69 of the hopper 2. A fine adjustment in this respect is effected by turning the spindle 89 in an appropriate direction with the aid of the handle 90. It will be evident that this will cause the slide 87 to move slowly in one or other direction along the housing 88, this movement being transmitted to the annulus 70 by way of the coupling rod 91 and the sector plate 74. It is also possible to effect a coarse adjustment of the angular setting of the annulus 70 about the nozzle 69 by removing the bent-over end of the coupling rod 91 from the hole 76 and turning the annulus 70 manually about the nozzle 69 until the end of the coupling rod can be entered in either the hole 75 or the hole 77. It will be evident from FIGURE 3 of the drawings that, when the hole 75 is employed, the outlet ports 71 will be disposed on the left-hand side of the plane 46A relative to the direction 103 whereby the material will be spread by the ejector 3 substantially wholly on the right-hand side of the said plane. The material will, in fact, be ejected over an arc commencing at the end 104 (FIGURES 1 and 2) of the screening baffle 92 which end is located immediately to one side of the bend 8 in the frame beam 4. It will be evident that, in order to bring the annulus 70 to a setting in which the material is spread substantially wholly on the left-hand side of the plane 46A, the coupling rod 91 must be entered in the hole 77.

Coarse adjustments of the ring 72 carrying the masking plates or shutters 73 about the nozzle 69 are effected by disengaging the bent-over end of the coupling rod 85 from the hole in the lug 79 and entering it in either the hole in the lug 78 or the hole in the lug 80 depending upon whether the coupling rod 91 is entered in the hole 75 or the hole 77. Fine adjustments of the angular setting of the ring 72 are effected whichever of the three lugs 78 to 80 is employed by turning the control lever 83 about the pin 86 and along the curved member 84 having the scale. It will be evident from FIGURE 1 of the drawings that this movement is transmitted to the ring 72 by way of the coupling rod 85. The clamp 84A is employed to retain the control lever 83 in register with any chosen mark on the scale.

The shape of the frame 1 is such that its width is at a minium at about the level of the ejector 3. The horizontal width of the implement as seen in the direction indicated by the arrow II of FIGURE 1 (see FIGURE 2) is least at the level of the interengaging bends 8 and 11 and progressively increases above and below this level. It is only throughout an angle 107 (FIGURE 3) of not more than 60° and having an actual magnitude of about 23° that there are any parts of the frame which lie in the path of material ejected radially by the spreading member 3. The said parts are located in front of the spreading member or ejector 3 and the construction and arrangement are such that material can be spread from the implement in any one of a number of different directions without any substantial proportion of it coming into contact with the frame. This is conducive to the uniform distribution of the material over the surface of the ground.

When the implement is not in use, it can stand on the ground by the supports formed by the foot plates 16 and 17 and the bent strip 36A. The upper limb 37 of the forked bracket 36 serves as a step and may be used when, for example, the implement is connected to the three-point lifting device of a tractor or other vehicle and the hopper 2 is being filled with a fresh supply of material. The hopper 2 can be removed from the implement as a whole merely by turning the clamp 63 about the pivot pin 62 in an anticlockwise direction as seen in FIGURE 4, by means of the handle 63A, until the said clamp reaches the position shown in broken lines in FIGURE 4. When this position is reached, the aforementioned flat side 105 of the clamp will abut against the web of the leaf spring 66. All that is then necessary to remove the hopper 2 is to lift it vertically off the ejector 3, the dowels 52 and 56 sliding vertically out the holes 53 and 57 respectively. After the removal of the hopper 2, the annulus 70 and ring 72 can also be removed merely by disengaging the coupling rods 85 and 91 therefrom and lifting them off the ejector 3.

The guard 95 and the parts to which it is secured can also be removed readily from the implement by withdrawing the resilient retaining clips 99 from the holes in the dowels 97 and 98 and subsequently moving the guard 95 a short distance to the rear relative to the direction 103. This movement disengages the dowels 97 and 98 from the holes in the beam 42 and also the dowels 101 and 102 from the holes in the guard 95 itself. The ready removal of the various parts of the implement that have just been mentioned greatly facilitates easy cleaning of the whole implement which, obviously, lengthens the life of the implement and improves its effectiveness in use. If desired, two or more alternative hoppers of somewhat different shapes can be provided for use with the same implement, the ready removal of each hopper in the manner which has just been described making the interchange of different hoppers a quick and simple operation.

Fastening of the hopper 2 in its operative position with the aid of the retaining mechanism 61 is easily effected. Referring to FIGURE 4 of the drawings, the short bar 58 is constructed and arranged in such a way that a line 106A extending perpendicularly from the surface of the bar which is contacted by the mid-point of the lowermost side 64 of the clamp 63 is inclined at a relatively small angle 106 to a further line 106B extending between the point of the intersection of the line 106A with the side 64 and the longitudinal axis of the pivot pin 62. The line 106B is, of course, contained in the same substantially vertical plane as the line 106A. As will be evident from the foregoing description, the leaf spring 66 tends to maintain the clamp 63 in the position shown in full lines in FIGURE 4 but the said clamp would remain in that position in any case since the perpendicular distance between the longitudinal axis of the pivot pin 62 and the mid-point of the side 64 is greater than the minimum distance between said axis and the surface of the bar 58 which is engaged by the side 64. If, after a substantial period of use, one or both of the abutting faces of the bar 58 and side 64 become worn, this can be readily compensated for merely by providing a new and thicker spacing strip or plate 59.

Although the implement which has been described has a screening baffle 92, a screening plate 94 and a circular guard 95, an implement in accordance with the invention may, if desired, omit the guard 95 or, alternatively, omit the parts 92 and 94 whilst retaining the guard 95. When a large area of ground is to be spread with powdered or granular material with the aid of the implement which has been described, a wagon or the like containing a bulk supply of the material can be hitched to the forked bracket 36 by means of a vertical pin entered through the hole 38. The hopper 2 can then be filled from the wagon or the like without having to return to a specific loading point.

What we claim is:

1. An implement for spreading powdery or granular material comprising a frame, a hopper for said material mounted on the frame, a rotary spreading member on the frame below said hopper, said hopper having a discharge opening communicating with said spreading member, said frame comprising a substantially V-shaped frame portion, arranged underneath said spreading member, linkage means on said frame for coupling the implement to the hydraulic lifting device of a tractor, said V-shaped frame portion having frame beams diverging into the intended direction of travel of the implement, the frame being supported when not coupled to the lifting device of the tractor, on three supports arranged below said frame, two foremost supports being arranged at or near the foremost end of said V-shaped frame portion, each of said foremost supports having a foot which is in top view at least partly outside of said V-shaped frame portion, so as to obtain a stable support for said implement.

2. An implement as claimed in claim 1, wherein the feet of said three supports are situated in a plane, or nearly to, which is inclined to the plane of the V-shaped frame portion.

3. An implement as claimed in claim 1, wherein the two foremost supports extend backwardly as viewed into the intended direction of travel of the implement.

4. An implement as claimed in claim 1, wherein the third support is arranged at or near the rearmost end of said V-shaped frame portion, said third support having the form of a bent strip.

5. An implement as claimed in claim 1, wherein the V-shaped frame portion is connected to an upstanding frame portion, said upstanding frame portion comprising two frame beams, the two foremost supports forming elongations of said two frame beams.

References Cited

UNITED STATES PATENTS

| | | | |
|---|---|---|---|
| 1,696,048 | 12/1928 | McCormick et al. | 222—410 X |
| 3,100,645 | 8/1963 | Mascaro | 239—687 |

STANLEY H. TOLLBERG, *Primary Examiner.*